US008545167B2

(12) United States Patent  (10) Patent No.: US 8,545,167 B2
Cheung  (45) Date of Patent: Oct. 1, 2013

(54) COMPOSITE CASING FOR ROTATING BLADES

(75) Inventor: Kin-Leung Cheung, Toronto (CA)

(73) Assignee: Pratt & Whitney Canada Corp., Longueuil (CA)

(*) Notice: Subject to any disclaimer, the term of this patent is extended or adjusted under 35 U.S.C. 154(b) by 802 days.

(21) Appl. No.: 12/547,812

(22) Filed: Aug. 26, 2009

(65) Prior Publication Data

US 2011/0052382 A1  Mar. 3, 2011

(51) Int. Cl.
F01D 21/14 (2006.01)

(52) U.S. Cl.
USPC ............... 415/9; 264/255; 415/197; 415/200

(58) Field of Classification Search
USPC .............. 415/9, 196, 197, 173, 174.4, 200;
524/445, 435, 495; 252/62.54; 501/1; 525/50;
264/255, 275
See application file for complete search history.

(56) References Cited

U.S. PATENT DOCUMENTS

| 4,086,378 A | 4/1978 | Kam et al. |
| 4,438,173 A | 3/1984 | Trost |
| 4,902,201 A | 2/1990 | Neubert |
| 4,961,685 A | 10/1990 | Neubert |
| 5,437,538 A | 8/1995 | Mitchell |
| 5,447,411 A | 9/1995 | Curley et al. |
| 5,747,560 A | 5/1998 | Christiani et al. |
| 5,883,173 A | 3/1999 | Elspass et al. |
| 6,053,696 A | 4/2000 | Roberts |
| 6,057,035 A | 5/2000 | Singh et al. |
| 6,454,974 B1 | 9/2002 | Wilson |
| 6,558,605 B1 | 5/2003 | Wilson |
| 6,692,064 B1 | 2/2004 | Porter |
| 6,759,463 B2 | 7/2004 | Lorah et al. |
| 6,767,951 B2 | 7/2004 | Nair et al. |
| 6,872,432 B2 | 3/2005 | Wilson |
| 6,977,115 B1 | 12/2005 | Wilson |
| 6,988,305 B1 | 1/2006 | Wilson |
| 7,169,467 B2 | 1/2007 | Wilson |
| 7,244,781 B2 | 7/2007 | Bortnick et al. |
| 7,246,990 B2 | 7/2007 | Xie et al. |
| 7,250,477 B2 | 7/2007 | Guo et al. |
| 7,291,665 B2 | 11/2007 | Lorah |
| 7,338,250 B2 | 3/2008 | Martindale et al. |
| 7,371,793 B2 | 5/2008 | Gong |
| 8,061,966 B2 * | 11/2011 | Xie et al. ............... 415/9 |
| 2004/0259996 A1 | 12/2004 | Stoppelmann et al. |

(Continued)

OTHER PUBLICATIONS

D. Ratna et al., Clay-reinforced epoxy nanocomposites, 2003, Polymer International, pp. 1403-1407.*

(Continued)

Primary Examiner — Nathaniel Wiehe
Assistant Examiner — Woody A Lee, Jr.
(74) Attorney, Agent, or Firm — Norton Rose Fulbright Canada LLP

(57) ABSTRACT

A gas turbine engine includes a fan including a plurality of circumferentially spaced rotatable blades, and a fan casing for containing fragments of fan blades in the event of blade release, the fan casing having a shell surrounding the blades and circumscribing a containment zone of the fan. The shell is made of a fiber reinforced polymer composite material which includes nanoparticles.

16 Claims, 2 Drawing Sheets

(56) References Cited

U.S. PATENT DOCUMENTS

| | | |
|---|---|---|
| 2007/0081887 A1 | 4/2007 | Xie et al. |
| 2007/0128960 A1 | 6/2007 | Ghasemi Nejhad et al. |
| 2007/0142548 A1 | 6/2007 | Nejhad et al. |
| 2007/0265379 A1 | 11/2007 | Chen et al. |
| 2007/0276077 A1 | 11/2007 | Mao et al. |
| 2007/0280817 A1 | 12/2007 | Costa et al. |
| 2008/0086096 A1 | 4/2008 | Voznyakovski et al. |
| 2008/0134939 A1 | 6/2008 | Arpac et al. |
| 2008/0176987 A1* | 7/2008 | Trevet et al. ............ 524/447 |
| 2008/0200600 A1 | 8/2008 | Schomaker et al. |
| 2009/0226310 A1* | 9/2009 | Finn et al. ............ 415/200 |
| 2010/0148396 A1* | 6/2010 | Xie et al. ............ 264/259 |

OTHER PUBLICATIONS

W. Liu, S.V. Hoa, M. Pugh, "Fracture Toughness and Water Uptake of High-Performance Epoxy/Nanoclay Nanocomposites", Composite Science and Technology, pp. 2364-2373, Jun. 2005.

Y. Xu, S.V. Hoa, "Properties Enhancement of Carbon-Fiber-Reinforced Epoxy/Clay Nanocomposites", Cancom 2007, NM-5.

D. Ratna, N. R. Manoj, R. Varley, R.K. Singh Raman, G.P. Simon, "Clay-Reinforced Epoxy Nanocomposites", Polymer International, pp. 1403-1407, Mar. 2002.

G. Zhou, L.J. Lee, "Nano-Clay and Long Fiber Reinforced Composites Based on Epoxy and Phenolic Resins", ANTEC 2003, pp. 2094-2098, 2003.

* cited by examiner

COMPOSITE CASING FOR ROTATING BLADES

TECHNICAL FIELD

The application relates generally to composite casings for rotating blades and, more particularly, to such a casing for a fan blade of a gas turbine engine.

BACKGROUND

An aircraft turbine engine fan casing is required to contain released fan blades in the event of blade failure. Fiber reinforced polymer composite materials have been used in fan casings because of their high strength to density ratio when compared to metal alloys.

When fiber reinforced polymer composite material is subjected to a high energy impact, such as in a fan casing during blade release, the impact energy is generally absorbed by fiber breaking, fiber pull out, resin cracks, and ply delamination. A fan casing usually has to absorb impact energy, resist puncture, and maintain structural integrity for safe engine shutdown.

A known theory to improve the energy absorption capability of fiber reinforced polymer composite materials is to promote fiber pull out. Fiber pull out generally absorbs energy via the creation of new surfaces between the fibers and the resin due to the frictional force that pulls and separates the fibers from the resin. However, fiber pull out usually reduces the post impact carrying load capability and structural integrity of the composite material, as pulled out fibers can no longer transfer loads to other fibers through the resin.

Accordingly, improvements are desirable.

SUMMARY

In one aspect, there is provided a gas turbine engine comprising a fan including a plurality of circumferentially spaced rotatable blades, and a casing for containing fragments of the blades in the event of blade release, the casing including a shell surrounding the blades and circumscribing a containment zone of the fan, the shell being made of a fiber reinforced polymer composite material including nanoparticles.

In another aspect, there is provided a casing for surrounding rotating blades and containing blade fragments thereof in the event of blade release, the casing comprising a shell made of a composite material including a polymer resin, reinforcing fibers and nanoparticles, the fibers forming a first bond with the resin resisting separation up to a first mean impact energy threshold, the nanoparticles forming a second bond with the resin resisting separation up to a second mean impact energy threshold, the first mean impact energy threshold being substantially greater than the second mean impact energy threshold, such that upon impact of blade fragments with the casing, separation of the nanoparticles from the resin absorbs a portion of the impact energy.

In another aspect, there is provided a method of improving post-impact structural integrity of a fan casing after a high speed, high energy impact from a released blade or blade portion, the casing being made of a fiber reinforced polymer resin composite material, the method comprising adding nanoparticles in the polymer resin during manufacture of the casing, wherein separation of the nanoparticles from the resin during the impact absorbs a portion of the impact energy and reduces pull out and breaking of the fibers.

In a further aspect, there is provided a method of manufacturing a fan casing having improved blade containment capability, the method comprising forming the fan casing from a composite material including a polymer resin, reinforcing fibers and nanoparticles, the nanoparticles having an area of resin interface per volume substantially greater than that of the reinforcing fibers, an average impact energy threshold necessary for causing separation of any one of the nanoparticles from the resin being substantially lower than that for causing separation or breaking of any one of the fibers in the resin, such that during impact of a blade or a blade portion on the casing, the lower impact energy threshold of the nanoparticles causes separation of the nanoparticles from the resin to predominate over separation of the fibers from the resin or breaking of the fibers in the resin, thus limiting a reduction of a structural integrity of the casing caused by the impact, and the greater area of interface per volume of the nanoparticles limits an area of damage caused by the impact.

DESCRIPTION OF THE DRAWINGS

Reference is now made to the accompanying figures in which.

DETAILED DESCRIPTION

Figure 1:
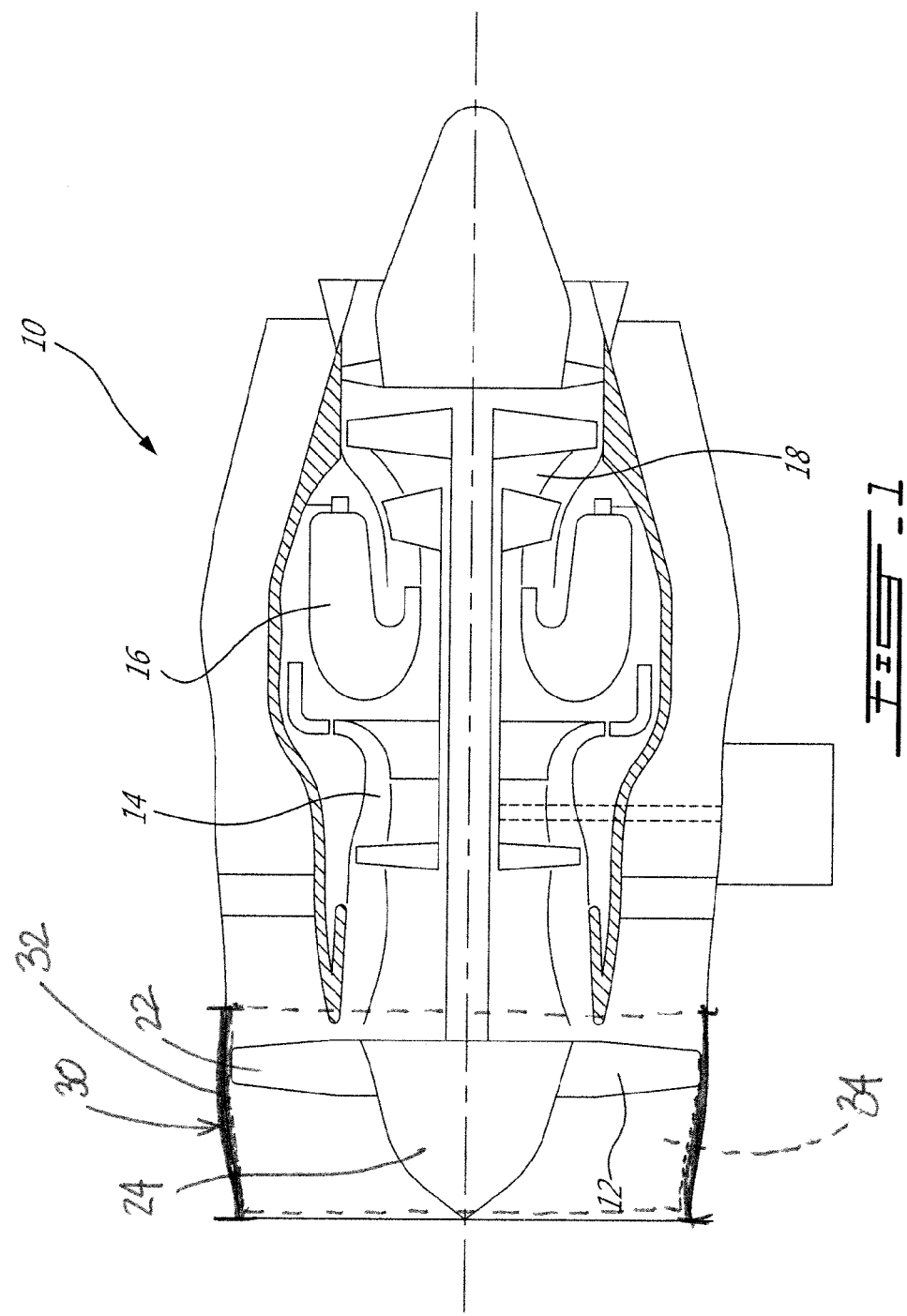
FIG. 1 is a schematic cross-sectional view of a gas turbine engine, including a fan casing according to a particular embodiment of the present invention.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan assembly 12 includes an array of fan blades 22 extending radially outward from a rotor disc 24. A fan casing 30 surrounds the fan assembly 12. The fan casing 30 is a containment system and includes a shell 32 which has a longitudinal length that is approximately equal to a fan assembly length. More specifically, the length is selected so that the shell circumscribes a containment zone 34 of the fan assembly 12. The shell therefore has an impact zone which circumscribes at least the blades 22 of the fan. This impact zone defines the containment zone, which is defined as a zone extending both axially and circumferentially around the fan assembly 12 where a fan blade or blade fragment is most likely to be ejected from the fan assembly 12.

The shell 32 is made of a fiber reinforced polymer composite material, with nanoparticles added during the manufacture of the shell 32, e.g. prior to molding. In a particular embodiment, the shell 32 is made of carbon fiber reinforced epoxy. Alternate fiber reinforced polymer composite materials include aromatic polyamide (aramid) fibers such as Kevlar® and Twaron®, ultra high molecular weight polyethylene fibers such as Spectra® and Dyneema®, poly(diimidazo pyridinylene(dihydroxy)phenylene) fibers such as M5®, and poly(p-phenylene-2-6-benzobisoxazole) fibers such as Zylon®, and the like, bonded with an appropriate thermoset or thermoplastic.

In a particular embodiment, the nanoparticles are clay or clay based reinforcements (e.g. montmorillonite), particle dispersions (e.g. magnetic particles, e.g. Cobalt iron oxide), molecules such as hyper-branched polymers, nano-spheres (e.g. ceramic powders e.g. $SiO_2$, $TiO_2$), elements (e.g. carbon, carbon nano-tubes), nanolarge pendant groups grafted on the end of the polymer chain, or any adequate combination thereof.

The nanoparticles are preferably provided with a content of at least 2 phr. In a particular embodiment, the nanoparticles are provided up to a content of 10 phr.

The difference between the fracture surface of a resin with and without nanoparticles included therein is significant. For example, in test conducted, the fracture surface of a resin with 6 phr of nano-clay particles was shown to undergo much more deformation before fracture than the fracture surface of a resin without nanoparticles, which had a smooth featureless brittle fracture surface.

Tests of samples of carbon fiber reinforced epoxy without nanoparticles and with 2 phr of nano-clay particles have shown that when compared to the composite without nanoparticles, the composite with 2 phr nano-clay had a Mode I interlaminar fracture toughness approximately 52% greater; a flexural strength approximately 38% greater; and a modulus of elasticity approximately 37% greater.

As the surface area of a nanoparticle is much smaller than that of a continuous fiber strand, fracture by resin-nanoparticle separation predominates over fiber-resin separation, or fiber pull-out, and over fiber break, because nano-size fractures are much easier to create than millimeter-sized fractures. In other words, the bond between each fiber and the resin resists separation up to a first mean impact energy threshold, while the bond between each nanoparticle and the resin resists separation up to a second mean impact energy threshold, with the first mean impact energy threshold being substantially greater than the second mean impact energy threshold. As such, upon high speed, high energy impact of blade fragments with the casing shell 32, a portion of the impact energy is absorbed through separation of the nanoparticles from the resin, with only the portion of the impact energy not absorbed by resin-nanoparticle separation being left for potentially causing fiber pull-out and fiber break.

As one gram of nanoparticles has a surface area that can be over 200 and even over 1200 square meters, minute additions creates a large amount of resin-nanoparticle interface in a small volume of material. Thus with the large amount of resin-nanoparticle interface per unit volume, and with a portion of the blade impact energy being absorbed via resin-nanoparticle separation, the damage caused by the blade impact is distributed in a much smaller area and volume of the casing shell 32 when compared to the damage that would be caused if the same impact energy was completely absorbed by resin-fiber separation and fiber break; the addition of nanoparticles in the casing shell 32 thus advantageously reduces the area of impact damage.

As the energy absorbed by the resin-nanoparticle separation significantly reduces the amount of fiber pull-out produced by the impact, as well as the amount of energy remaining for causing other types of damages such as fiber break and resin damage, and as the nanoparticles also significantly reduce the area and volume of damage caused by the impact, the residual structural strength and structural integrity of the casing shell 32 after impact are thus improved. In addition, the undamaged area of the shell 32 continues to benefit from the enhanced material properties brought by the presence of the nanoparticles.

Figure 2:
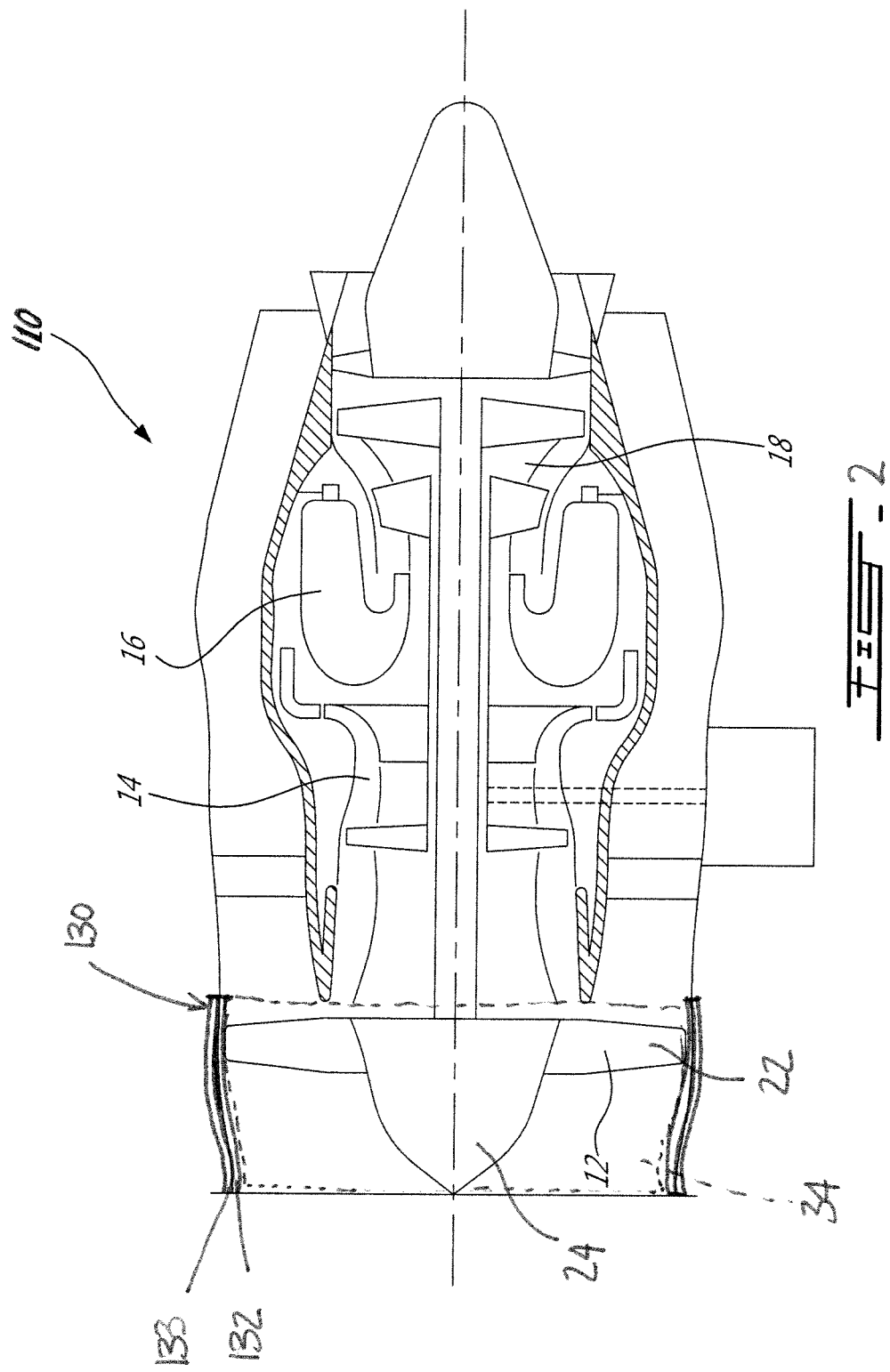
FIG. 2 is a schematic cross-sectional view of a gas turbine engine, including a fan casing according to an alternate embodiment of the present invention.

Referring to FIG. 2, an alternate embodiment is shown, where an engine 110 includes a fan casing 130 with a first shell 132 circumscribing the containment zone 34 of the fan assembly 12, and a second shell 133 surrounding the first shell 132. As in the previous embodiment, the first shell 132 is made of fiber reinforced polymer composite material including nanoparticles. The second shell 133 is also made of a fiber reinforced polymer composite material including nanoparticles, and may have a higher ratio of continuous fiber to resin content than that of the first shell 132. In a particular embodiment, the first and second shells 132, 133 are made of the same fiber reinforced polymer composite material, and have the same type of nanoparticles included therein. Alternately, the two shells 132, 133 can be made of different materials. In a particular embodiment, the first shell 132 is molded, and the second shell 133 is then molded onto the first shell 132.

The second shell 133 benefits from energy absorbed by the first shell, thus further lessening the amount of fiber pull-out and fiber break caused by the impact as well as the size of the area and volume of impact damage. As such, the post impact structural integrity of the fan casing 130 is further improved by the presence of the second shell 133. In addition, a higher fiber content in the second shell 133 further improves post impact structural strength and structural integrity of the fan casing 130.

The fiber reinforced polymer composite material described in each of the embodiments above may include a polymer resin having reinforcing fibers therein. The polymer resin may be selected from the group consisting of epoxy, polyphenylene sulfide (PPS), polyetheretherketone (PEEK) and polyetherketoneketone (PEKK). The reinforcing fibers may be selected from the group consisting of carbon fibers, aromatic polyamide (aramid fibers), ultra high molecular weight polyethylene fibers, poly(diimidazo pyridinylene(dihydroxy)phenylene) fibers, and poly(p-phenylene-2-6-benzobisoxazole) fibers.

The above description is meant to be exemplary only, and one skilled in the art will recognize that changes may be made to the embodiments described without departing from the scope of the invention disclosed. For example, the fiber reinforced polymer composite casings 30, 130 including nanoparticles can be used around other rotating equipment which have a risk of producing fragments which must be contained, for example around turbine rotors in a gas turbine engine or elsewhere. Still other modifications which fall within the scope of the present invention will be apparent to those skilled in the art, in light of a review of this disclosure, and such modifications are intended to fall within the appended claims.

The invention claimed is:

1. A gas turbine engine comprising:
a fan including a plurality of circumferentially spaced rotatable blades; and
a casing for containing fragments of the blades in the event of blade release, the casing including a shell surrounding the blades, the shell having an impact zone circumscribing the blades, the impact zone of the blades defining a containment zone of the fan, the shell being made of a fiber reinforced polymer composite material and the impact zone of the shell including nanoparticles in the fiber reinforced polymer composite material.

2. The engine as defined in claim 1, wherein the composite material of the impact zone of the shell has a content of the nanoparticles of at least 2 phr.

3. The engine as defined in claim 1, wherein the composite material of the impact zone of the shell has a content of the nanoparticles of up to 10 phr.

4. The engine as defined in claim 1, wherein the nanoparticles include one or more selected from the group consisting of clay, clay based reinforcements, particle dispersions, hyper-branched polymers, nano-spheres, elements, and nanolarge pendant groups grafted on the end of a chain of the polymer.

5. The engine as defined in claim 1, wherein the nanoparticles include one or more selected from the group consisting of montmorillonite, magnetic particles, Cobalt iron oxide, ceramic powders, carbon, and nano-tubes.

6. The engine as defined in claim 1, wherein the fiber reinforced polymer composite material includes a polymer resin having reinforcing fibers therein, the polymer resin being selected from the group consisting of epoxy, polyphenylene sulfide (PPS), polyetheretherketone (PEEK) and polyetherketoneketone (PEKK), and the reinforcing fibers being selected from the group consisting of carbon fibers, aromatic polyamide (aramid fibers), ultra high molecular weight polyethylene fibers, poly(diimidazo pyridinylene(dihydroxy)phenylene) fibers, and poly(p-phenylene-2-6-benzobisoxazole) fibers.

7. The engine as defined in claim 1, wherein the shell is a first shell, the casing further comprising a second shell surrounding the first shell, the second shell being made of a fiber reinforced polymer composite material including nanoparticles, the second shell including a higher ratio of continuous fiber to resin content than that of the first shell.

8. A casing for surrounding rotating blades of a gas turbine engine fan and containing blade fragments thereof in the event of blade release, the casing comprising a shell having an impact zone, the impact zone of the blades defining a containment zone of the fan, the impact zone of the shell being made of a composite material including a polymer resin, reinforcing fibers and nanoparticles, the fibers forming a first bond with the resin resisting separation up to a first mean impact energy threshold, the nanoparticles forming a second bond with the resin resisting separation up to a second mean impact energy threshold, the first mean impact energy threshold being substantially greater than the second mean impact energy threshold, such that upon impact of blade fragments with the impact zone of the casing, separation of the nanoparticles from the resin absorbs a portion of the impact energy.

9. The casing as defined in claim 8, wherein the composite material has a content of the nanoparticles of up to 10 phr.

10. The casing as defined in claim 8, wherein the nanoparticles include one or more selected from the group consisting of clay, clay based reinforcements, particle dispersions, hyper-branched polymers, nano-spheres, elements, and nanolarge pendant groups grafted on the end of a chain of the polymer.

11. The casing as defined in claim 8, wherein the nanoparticles include one or more selected from the group consisting of montmorillonite, magnetic particles, Cobalt iron oxide, ceramic powders, carbon, and nano-tubes.

12. The casing as defined in claim 8, wherein the polymer resin is selected from the group consisting of epoxy, polyphenylene sulfide (PPS), polyetheretherketone (PEEK), and polyetherketoneketone (PEKK), and the fibers are selected from the group consisting of carbon fibers, aromatic polyamide (aramid fibers), ultra high molecular weight polyethylene fibers, poly(diimidazo pyridinylene(dihydroxy)phenylene) fibers, and poly(p-phenylene-2-6-benzobisoxazole) fibers.

13. The casing as defined in claim 8, wherein the shell is a first shell, the composite material is a first composite material, and the polymer resin, reinforcing fibers and nanoparticles are first polymer resin, reinforcing fibers and nanoparticles, respectively, the casing further comprising a second shell surrounding the first shell, the second shell being made of a second composite material including a second polymer resin, second reinforcing fibers and second nanoparticles, a ratio of a fiber to resin content in the second composite material being higher than that of the first composite material.

14. A method of manufacturing a fan casing having improved blade containment capability, the method comprising forming the fan casing having shell defining an impact zone of the fan blades, at least the impact zone of the fan casing being formed from a composite material including a polymer resin, reinforcing fibers and nanoparticles, the nanoparticles having an area of resin interface per volume substantially greater than that of the reinforcing fibers, an average impact energy threshold necessary for causing separation of any one of the nanoparticles from the resin being substantially lower than that for causing separation or breaking of any one of the fibers in the resin, such that during impact of a blade or a blade portion on the impact zone of the fan casing, the lower impact energy threshold of the nanoparticles causes separation of the nanoparticles from the resin to predominate over separation of the fibers from the resin or breaking of the fibers in the resin, thus limiting a reduction of a structural integrity of the casing caused by the impact, and the greater area of interface per volume of the nanoparticles limits an area of damage caused by the impact.

15. The method as defined in claim 14, wherein forming the impact zone of the fan casing includes adding up to 10 phr of the nanoparticles.

16. The method as defined in claim 14, wherein forming the fan casing includes selecting the nanoparticles from the group consisting of montmorillonite, clay based reinforcements other than montmorillonite, magnetic particles, Cobalt iron oxide, particle dispersions, hyper-branched polymers, ceramic powders, nano-spheres, carbon particles, carbon nano-tubes, and nanolarge pendant groups grafted on the end of a chain of the polymer.

* * * * *